United States Patent
Hoshikawa et al.

(10) Patent No.: US 8,564,466 B2
(45) Date of Patent: Oct. 22, 2013

(54) ANALOG INPUT SYSTEM, ANALOG OUTPUT SYSTEM, AND ANALOG INPUT/OUTPUT SYSTEM

(75) Inventors: Masaru Hoshikawa, Chiyoda-ku (JP);
Shigeaki Takase, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 13/503,303

(22) PCT Filed: Aug. 1, 2011

(86) PCT No.: PCT/JP2011/067620
§ 371 (c)(1),
(2), (4) Date: Apr. 20, 2012

(87) PCT Pub. No.: WO2013/018190
PCT Pub. Date: Feb. 7, 2013

(65) Prior Publication Data
US 2013/0033390 A1    Feb. 7, 2013

(51) Int. Cl.
*H03M 1/00* (2006.01)

(52) U.S. Cl.
USPC ............. 341/141; 711/104; 711/167; 710/58; 710/59; 710/60; 714/43; 714/53; 714/55; 714/56; 714/749; 700/20; 700/3; 702/127; 702/176; 345/84; 345/87; 345/102

(58) Field of Classification Search
USPC ............. 341/140–155; 711/104, 167; 710/58, 710/59, 60; 714/43, 53, 55, 56, 749, 805, 714/E11.1, E11.084; 700/20.3; 702/127, 702/176; 345/84, 87, 102
See application file for complete search history.

(56) References Cited

U.S. PATENT DOCUMENTS

| | | | | |
|---|---|---|---|---|
| 5,822,777 A | * | 10/1998 | Leshem et al. | 711/167 |
| 5,850,528 A | * | 12/1998 | Walton et al. | 710/107 |
| 6,347,365 B1 | * | 2/2002 | Leshem et al. | 711/167 |

(Continued)

FOREIGN PATENT DOCUMENTS

| | | |
|---|---|---|
| JP | 7-146756 A | 6/1995 |
| JP | 10-307606 A | 11/1998 |

(Continued)

OTHER PUBLICATIONS

Korean Office Action dated May 27, 2013, KPA No. 10-2012-7009373.

*Primary Examiner* — Lam T Mai
(74) *Attorney, Agent, or Firm* — Sughrue Mion, PLLC

(57) ABSTRACT

To increase the number of analog inputs at low cost, an analog input system includes: one or more analog slave units each connected to a bus to which a CPU unit is connected, and each including an A/D-conversion device converting an analog value outputted by an external device into a first digital value, a buffer memory buffering a second digital value to be transferred to the CPU unit, and a nonvolatile storage device containing specific information of its own unit; and an analog master unit connected to the bus and including an operation section performing operation processing based on the specific information stored in the storage device with the first digital value being used as an input, to calculate the second digital value, the master unit performing on each of the slave input units the operation processing and processing of transferring the calculated second digital value to the buffer memory.

9 Claims, 6 Drawing Sheets

(56) References Cited

U.S. PATENT DOCUMENTS

| | | |
|---|---|---|
| 7,076,719 B2 * | 7/2006 | Anjo et al. .................... 714/749 |
| 7,911,440 B2 * | 3/2011 | Lee .............................. 345/102 |
| 2005/0216101 A1 | 9/2005 | Shimizu |

FOREIGN PATENT DOCUMENTS

| | | |
|---|---|---|
| JP | 2005-302006 A | 10/2005 |
| JP | 2006-165737 A | 6/2006 |
| JP | 2010-134830 A | 6/2010 |

* cited by examiner

FIG.4

| IDENTIFICATION ID | UNIT TYPE | FIRST DIGITAL REFERENCE VALUE | SECOND DIGITAL REFERENCE VALUE |
|---|---|---|---|
|  |  |  |  |
|  |  |  |  |
| ⋮ | ⋮ | ⋮ | ⋮ |

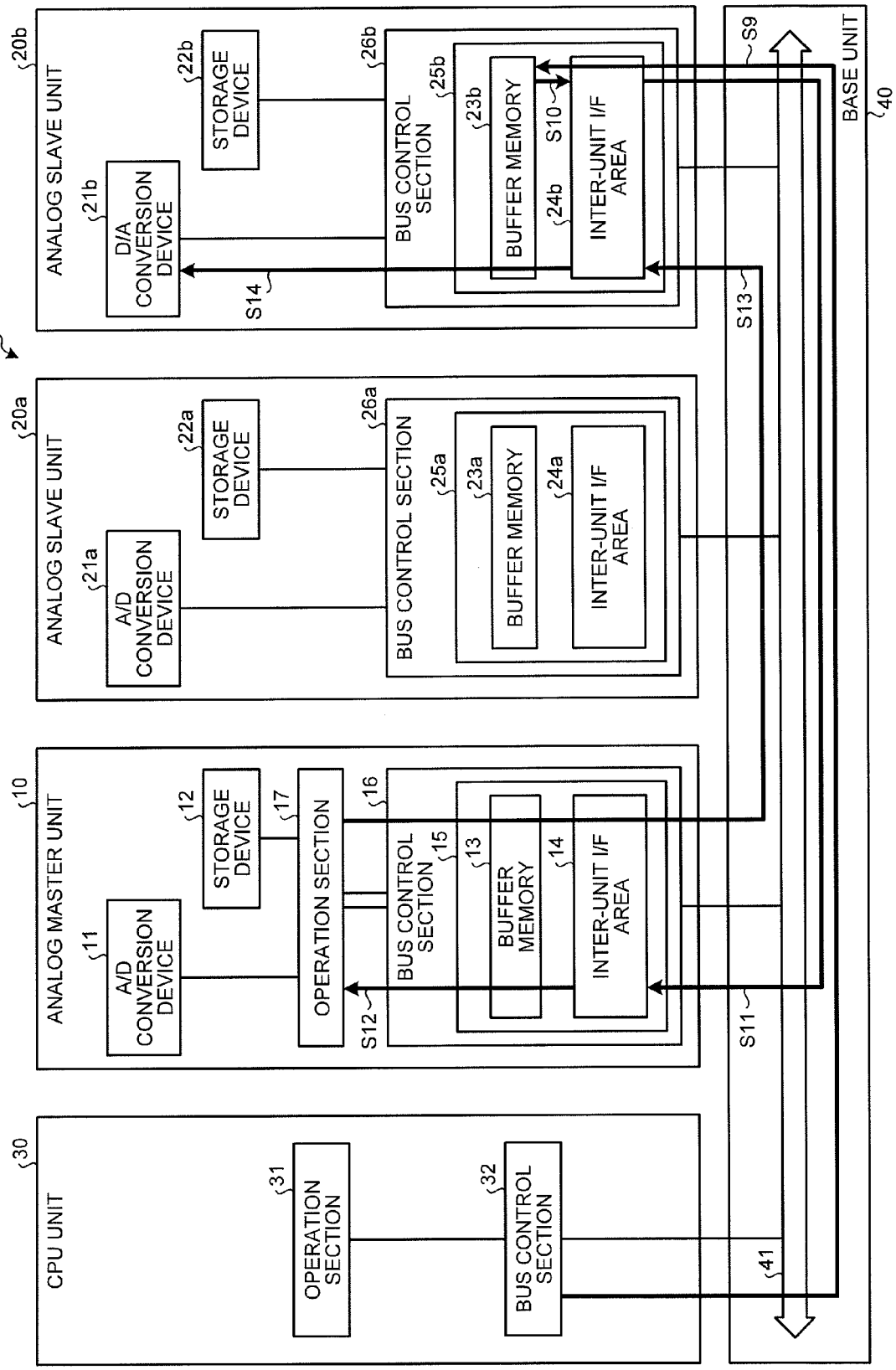

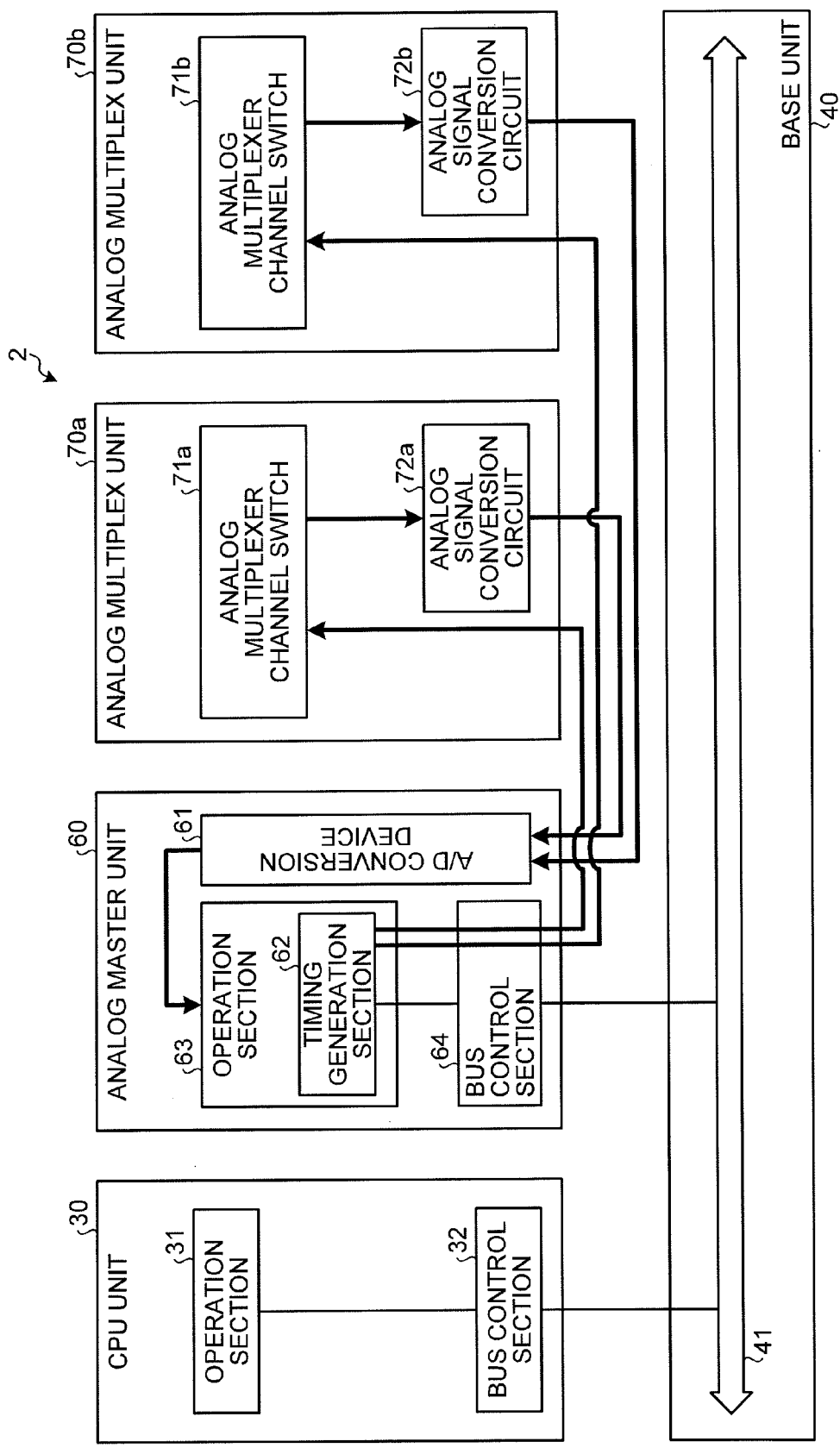

ANALOG INPUT SYSTEM, ANALOG OUTPUT SYSTEM, AND ANALOG INPUT/OUTPUT SYSTEM

CROSS REFERENCE TO RELATED APPLICATIONS

This application is a National Stage of International Application No. PCT/JP2011/067620, filed on Aug. 1, 2011, the contents of all of which are incorporated herein by reference in their entirety.

FIELD

The present invention relates to an analog input system, an analog output system, and an analog input/output system, which are mounted on a programmable logic controller (PLC).

BACKGROUND

Some PLCs are configured with a base unit being connected with one or more functional units. Functional units include a CPU unit for exercising control over the entire PLC, an analog input/output unit for performing input/output with an apparatus to be controlled, a network unit as a communication device for performing communication with other PLCs, and the like. The user can combine his/her desired functional units to construct a PLC. The base unit has a built-in bus, and a plurality of functional units mounted on the base unit can transmit/receive data to/from each other through the bus.

An analog input/output unit exchanges data with a CPU unit by use of a shared memory that is readable and writable by the CPU unit. It should be appreciated that an analog input/output unit collectively refer to an analog input unit which performs A/D conversion on an analog value inputted from an external device to generate a digital value to be passed to a CPU unit and write the generated digital value into a shared memory, and an analog output unit which performs D/A conversion on a digital value generated by a CPU unit and written into a shared memory to generate an analog value to be outputted to an external device.

The user can mount a plurality of analog input/output units on the base unit to increase the number of analog inputs and outputs (for example, see Patent Literature 1 and Patent Literature 2).

CITATION LIST

Patent Literature

Patent Literature 1: Japanese Patent Application Laid-open No. 2010-134830
Patent Literature 2: Japanese Patent Application Laid-open No. 2006-165737

SUMMARY

Technical Problem

Here, a digital value to be handled by the analog input/output unit is not a value itself that is outputted by an A/D conversion device included in an analog input unit or a value itself that is inputted to a D/A conversion device included in an analog output unit, but it is a value that is subjected to some numerical conversion by an operation section in the analog input unit or analog output unit.

For instance, an analog input unit to which a temperature value of a thermocouple, platinum resistance temperature detector or the like is inputted numerically converts an output value of the A/D conversion device into a temperature value based on a reference table for thermoelectric power or a reference table for resistance values of a resistance temperature detector, that is defined by JIS or other standards.

An analog input unit to which a voltage or current is inputted converts an analog input in a range of 0 to 10 V, 1 to 5 V, 4 to 20 mA or the like into a digital value, and then numerically converts the after-converted digital value into a digital value in a previously defined range such as 0 to 4000.

On the other hand, an analog input/output unit has functions that need to be implemented in the analog input/output unit, such as a function of performing averaging processing in the analog input/output unit based on the after-converted digital value and a function of outputting an alarm when the digital value is beyond a set range.

Consequently, when a plurality of analog input/output units are connected to a base unit to increase the number of analog inputs and outputs, all the analog input/output units to be connected need to include an operation section. This has caused a problem of cost increases.

The present invention has been achieved in view of the foregoing, and an object thereof is to provide an analog input system, an analog output system and an analog input/output system, which make it possible to increase the number of analog inputs or the number of analog outputs at low cost.

Solution to Problem

In order to solve the above-mentioned problems and achieve the object, the present invention provides an analog input system comprising: one or more slave input units each connected to a bus to which a CPU unit is connected, and each including an A/D conversion device that is connected to an external device for outputting an analog value and converts an analog value outputted by the external device into a first digital value, a first buffer memory that buffers a second digital value to be transferred to the CPU unit, and a nonvolatile storage device that stores specific information of its own unit; and a master unit connected to the bus and including an operation section that performs operation processing based on the specific information stored in the storage device with the first digital value outputted by the A/D conversion device being used as an input, thereby to calculate the second digital value, the master unit performing on each of the slave input units the operation processing of the operation section and processing of transferring the second digital value calculated by the operation processing to the first buffer memory.

Advantageous Effects of Invention

According to the analog input system of the present invention, it is possible to make connection of a plurality of analog slave units that function as analog input units, and since the analog slave units need not include any operation sections, it is possible to increase the number of analog inputs at low cost.

BRIEF DESCRIPTION OF DRAWINGS

FIG. 4 is a chart for describing a data structure of a connection slave unit table.

FIG. 6 is a diagram for describing an operation of the analog input/output system when handling an output signal.

FIG. 7 is a diagram for describing a technique according to a comparative example.

DESCRIPTION OF EMBODIMENTS

Hereinafter, an embodiment of the analog input system, analog output system and analog input/output system according to the present invention will be described in detail with reference to the drawings. It should be noted that the present invention is not limited to the embodiment.

Embodiment

Figure 1:
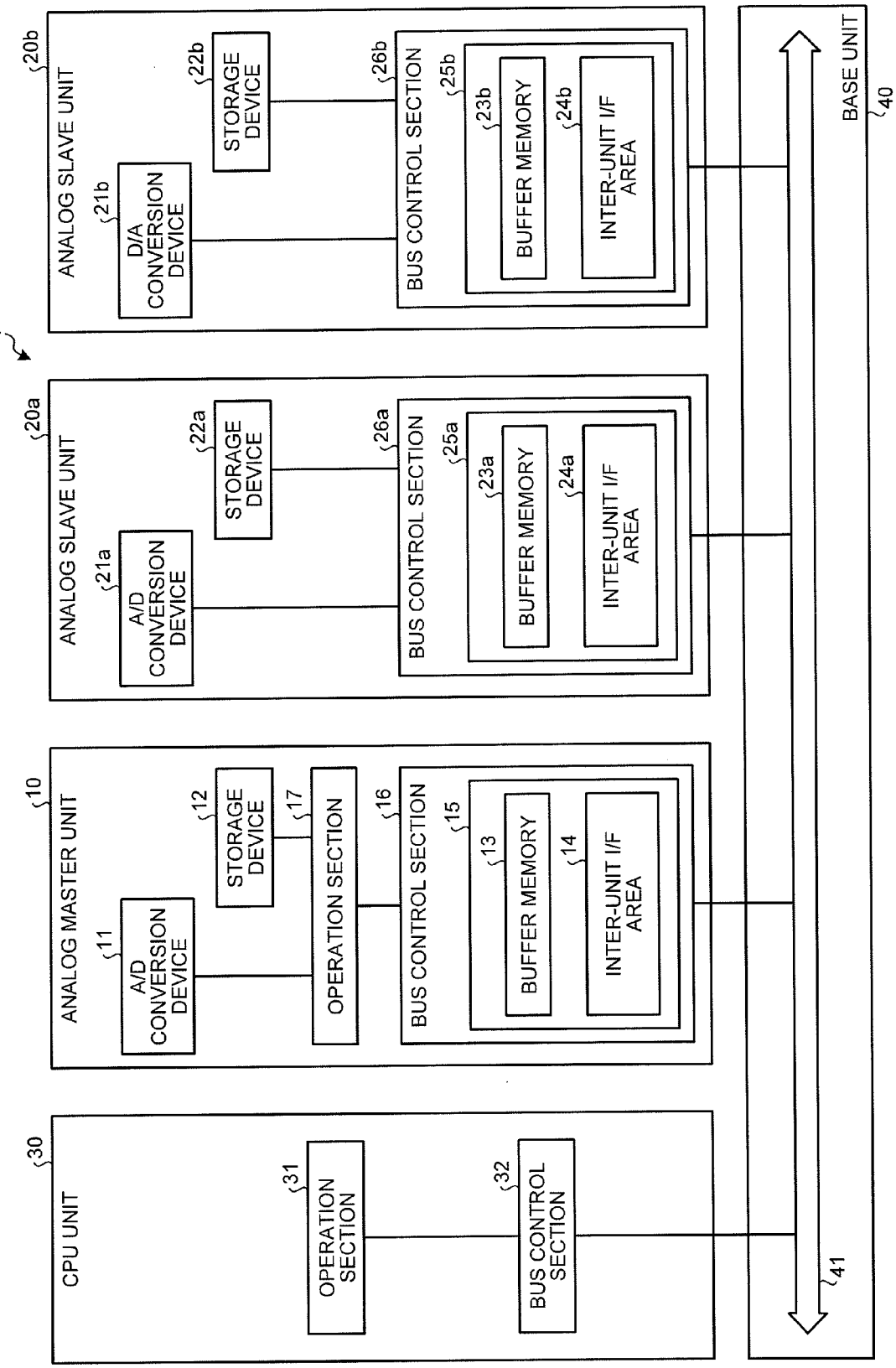
FIG. 1 is a diagram showing a configuration of a PLC to which an analog input system, an analog output system and an analog input/output system according to an embodiment of the present invention are applied.

FIG. 1 is a diagram showing a configuration of a PLC to which the analog input system, analog output system and analog input/output system according to an embodiment of the present invention are applied.

As shown in FIG. 1, a PLC 1 includes an analog master unit 10, a plurality of (here, two) analog slave units 20a and 20b, a CPU unit 30, and a base unit 40. It is supposed that the analog slave unit 20a is an analog input unit, and the analog slave unit 20b is an analog output unit. In other words, the analog master unit 10 and the analog slave unit 20a constitute an analog input system. The analog master unit 10 and the analog slave unit 20b constitute an analog output system. The analog master unit 10 and the analog slave units 20a and 20b constitute an analog input/output system. Hereinafter, the analog slave units 20a and 20b may be referred to collectively as analog slave units 20.

The base unit 40 is fitted with the analog master unit 10, the analog slave units 20a and 20b, and the CPU unit 30, and equipped with a bus 41 for electrically connecting these units.

The analog master unit 10 includes: an A/D conversion device 11 converts an analog value inputted from an external device into a digital value; a nonvolatile storage device 12; an operation section 17; a shared memory 15 that is primarily used as a buffer for transferring data between units; and a bus control section 16 that controls data transfer through the shared memory 15 and the bus 41. The analog master unit 10 may include a plurality of input terminals for analog values.

The analog slave unit 20a includes: an A/D conversion device 21a that converts an analog value inputted from an external device into a digital value; a nonvolatile storage device 22a; a shared memory 25a that is primarily used as a buffer for transferring data between units; and a bus control section 26a that performs data transfer through the shared memory 25a and the bus 41. The analog slave unit 20a may include a plurality of input terminals for analog values.

The analog slave unit 20b includes: a D/A conversion device 21b that converts a digital value generated by the CPU unit 30 into an analog value to be outputted to an external device; a nonvolatile storage device 22b; a shared memory 25b that is primarily used as a buffer for transferring data between units; and a bus control section 26b which controls data transfer through the shared memory 25b and the bus 41. The analog slave unit 20b may include a plurality of output terminals for analog values.

Here, a buffer memory 13 and an inter-unit I/F area 14 are reserved in the shared memory 15 included in the analog master unit 10. The buffer memory 13 is readable and writable by the CPU unit 30, and stores data transmitted from the CPU unit 30 and data to be transmitted to the CPU unit 30. The inter-unit I/F area 14 stores data transmitted from the analog slave units 20a and 20b and data to be transmitted to the analog slave units 20a and 20b.

Meanwhile, a buffer memory 23a and an inter-unit I/F area 24a are reserved in the shared memory 25a included in the analog slave unit 20a. The buffer memory 23a is readable and writable by the CPU unit 30, in which data transmitted from the CPU unit 30 and data to be transmitted to the CPU unit 30 are buffered. The inter-unit I/F area 24a is readable and writable by the analog master unit 10, in which data to be transmitted to the analog master unit 10 and data transmitted from the analog master unit 10 are stored. The inter-unit I/F area 24a also stores a conversion cycle setting value that describes a cycle of capturing an analog value inputted from an external device and converting the analog value into a digital value.

Also, a buffer memory 23b and an inter-unit I/F area 24b are reserved in the shared memory 25b included in the analog slave unit 20b. The buffer memory 23b is readable and writable by the CPU unit 30, in which data transmitted from the CPU unit 30 and data to be transmitted to the CPU unit 30 are stored. The inter-unit I/F area 24b is readable and writable by the analog master unit 10, in which data to be transmitted to the analog master unit 10 and data transmitted from the analog master unit 10 are stored. The inter-unit I/F area 24b also stores a conversion cycle setting value that describes a cycle of capturing a digital value transmitted from the CPU unit 30 and converting the digital value into an analog value to be outputted to an external device.

The bus control section 16 included in the analog master unit 10 performs data transfer between the inter-unit I/F area 14 included in its own unit 10 and the inter-unit I/F area 24a included in the analog slave unit 20a, and data transfer between the inter-unit I/F area 14 included in its own unit 10 and the inter-unit I/F area 24b included in the analog slave unit 20b. Specifically, for instance, when performing data transfer from the analog master unit 10 to the analog slave unit 20a, the bus control section 26a reads data stored in the inter-unit I/F area 14 of the analog master unit 10 and writes the data into the inter-unit I/F area 24a of the analog slave unit 20a during the time when the analog master unit 10 has a bus use right. On the other hand, when performing data transfer from the analog slave unit 20a to the analog master unit 10, the bus control section 16 reads data stored in the inter-unit I/F area 24a of the analog master slave unit 20a and reads the data into the inter-unit I/F area 14 of its own unit 10 during the time when the analog master unit 10 has a bus use right.

In such a way, the bus control section 16 performs data transfer between the analog master unit 10 and the analog slave units 20. The bus control section 16 transfers a digital value prior to operation processing (numerical conversion processing and correction processing, described later) from the analog slave units 20 to the analog master unit 10, and transfers a digital value obtained after the operation processing from the analog master unit 10 to the analog slave units 20. Designation of a data transfer source and a data transfer destination of the data transfer by the bus control section 16 is supposed to be done by the operation section 17.

In the analog slave unit 20a, the bus control section 26a can perform data transfer between the storage device 22a and the inter-unit I/F area 24a. Similarly, in the analog slave unit 20b, the bus control section 26b can perform data transfer between the storage device 22b and the inter-unit I/F area 24b. Designation of a data transfer source and a data transfer destination of the data transfer by the bus control sections 26a and 26b may be done by the operation section 17 through the bus control section 16 and the bus 41.

The operation section 17 included in the analog master unit 10 performs operation processing on a digital value obtained by the analog slave unit 20a performing A/D conversion, thereby to make it possible to calculate a digital value to be inputted to the CPU unit 30. The operation section 17 also performs operation processing on a digital value that the CPU unit 30 has outputted to the analog slave unit 20b, thereby to calculate a digital value that provides an analog value to be outputted to an external device when A/D converted by the analog slave unit 20b.

An algorithm of the numerical conversion processing to be performed on a digital value varies depending on the type of the analog input/output unit (unit type). An analog input/output unit of a type where a temperature value of a thermocouple, a platinum resistance temperature detector or the like is inputted thereto converts an after-A/D-converted digital value into a temperature value based on a reference table for thermoelectric power or a reference table for resistance values of a resistance temperature detector, defined by JIS or other standards. An analog input/output unit of a type where a voltage or current is inputted thereto converts an analog input of 0 to 10 V, 1 to 5 V, 4 to 20 mA, or the like into a digital value in a previously defined range of 0 to 4000 of the like. It should be noted that a concept of the numerical conversion processing covers averaging processing and processing of outputting an alarm when the digital value exceeds a previously set range.

Generally, conversion devices (A/D conversion devices and D/A conversion devices) generate reference voltages inside (for example, a GND voltage and a measurement upper limit voltage), and perform conversion based on comparison between analog signals of the generated reference voltages and an inputted/outputted analog value. The generated reference voltages usually contain errors, and/or circuits that constitute the conversion device include some error, and so direct use of the reference voltages for the conversion may fail to produce an intended conversion value.

Then, according to the embodiment of the present invention, the analog slave units 20 are caused to retain information specific to the respective units, such as the unit type and reference values for error correction, and in the analog master unit 10, the operation section 17 performs numerical conversion processing and correction processing based on the specific information retained in each analog slave unit 20.

Figure 2:
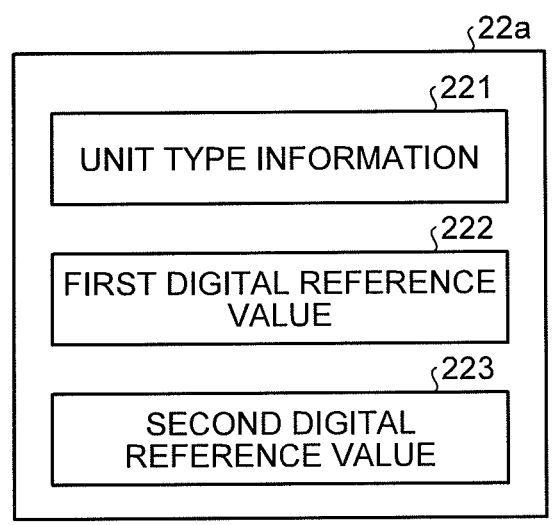
FIG. 2 is a diagram for describing a memory structure of a storage device included in an analog slave unit.

FIG. 2 is a diagram for describing a memory structure of the storage device 22a included in the analog slave unit 20a. As shown in the diagram, the storage device 22a previously stores: unit type information 221 that describes a unit type; a first digital reference value 222; and a second digital reference value 223. The unit type information 221 may be any information that can be used as a search key to search a numerical conversion processing table 121 described later and thereby select numerical conversion processing specific to the analog slave unit 20. For example, a model number may be employed as the unit type information 221.

The first digital reference value 222 and the second digital reference value 223 are set to be digital values that are obtained by the A/D conversion device 21a converting analog signals of a GND voltage and a measurement upper limit voltage, that are generated by a calibrator, respectively. The operation section 17 refers to the unit type information 221 set in the analog slave unit 20a, selects the numerical conversion processing intended for the analog slave unit 20, and performs the selected numerical conversion processing to calculate a digital value. Then, correction processing is performed on the digital value obtained after the numerical conversion processing, by use of the digital reference values 222 and 223.

The storage device 22b has the same memory structure as that of the storage device 22a. However, the first digital reference value 222 and the second digital reference value 223 are set to be digital values that provide an analog value indicating a GND voltage and an analog value indicating a measurement upper limit voltage, respectively, when converted by the D/A conversion device 21b.

It should be noted that the reference voltages are not limited to the GND voltage and the measurement upper limit voltage. By modifying an algorithm of the correction processing, any desired voltages can be used as the reference voltages.

Figure 3:
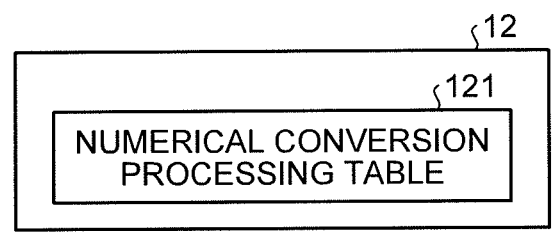
FIG. 3 is a diagram for describing a memory structure of a storage device included in an analog master unit.

FIG. 3 is a diagram for describing the memory structure of the storage device 12. The storage device 12 previously stores a numerical conversion processing table 121 that describes a plurality of numerical conversion processing procedures for respective unit types. The numerical conversion processing table 121 is configured so that it can be searched for a corresponding numerical conversion processing procedure with the unit type information 221 being used as a search key.

In addition, the analog master unit 10 retains a connection slave unit table 122 which manages the specific information (unit type, first digital reference value, and second digital reference value) on the analog slave units 20a and 20b that are connected to the same bus 41. FIG. 4 is a chart for describing a data structure of the connection slave unit table 122. As shown in the chart, the connection slave unit table 122 contains entries for each analog slave units 20, the entries including identification ID, a unit type, a first digital reference value, and a second digital reference value. The identification ID is an identification number for indicating which connection slot of the bus 41 is in connection with the analog slave unit 20.

Each of the entries that constitute the connection slave unit table 122 is registered, for example, by the operation section 17 at the time of start-up. Specifically, the operation section 17 controls the bus control section 16 to sequentially read specific information pieces from the respective storage devices 22a and 22b into the inter-unit I/F area 14 of the analog master unit 10 and sequentially register the read specific information pieces in the connection slave unit table 122. It should be noted that at the time of startup the bus control section 16 may autonomously read the specific information pieces from the respective analog slave units 20 and register the read specific information pieces in the connection slave unit table 122.

As one example, the following description is given concerning the case where the connection slave unit table 122 is retained in the inter-unit I/F area 14. However, the connection slave unit table 122 may be retained in any storage area in the analog master unit 10.

The CPU unit 30 includes: a bus control section 32 that reads a digital value stored in the buffer memory 13 of the analog master unit 10 and the buffer memory 23a of the analog slave unit 20a, and writes a digital value into the buffer memory 23b of the analog slave unit 20b; and an operation section 31 that performs an operation based on a user program with a digital value read by the bus control section 32 being used as an input, thereby to calculate a digital value to be written into the analog slave unit 20b. More specifically, the operation section 31 inputs/outputs a digital value each time it executes (scans) a beforehand built-in user program once. Consequently, reading of the digital value on the buffer memory 13 or 23a and updating of the digital value on the buffer memory 23b are carried out in each scan cycle of the user program.

The conversion cycle setting values may be the same as or different from the scan cycle of the user program.

Figure 5:
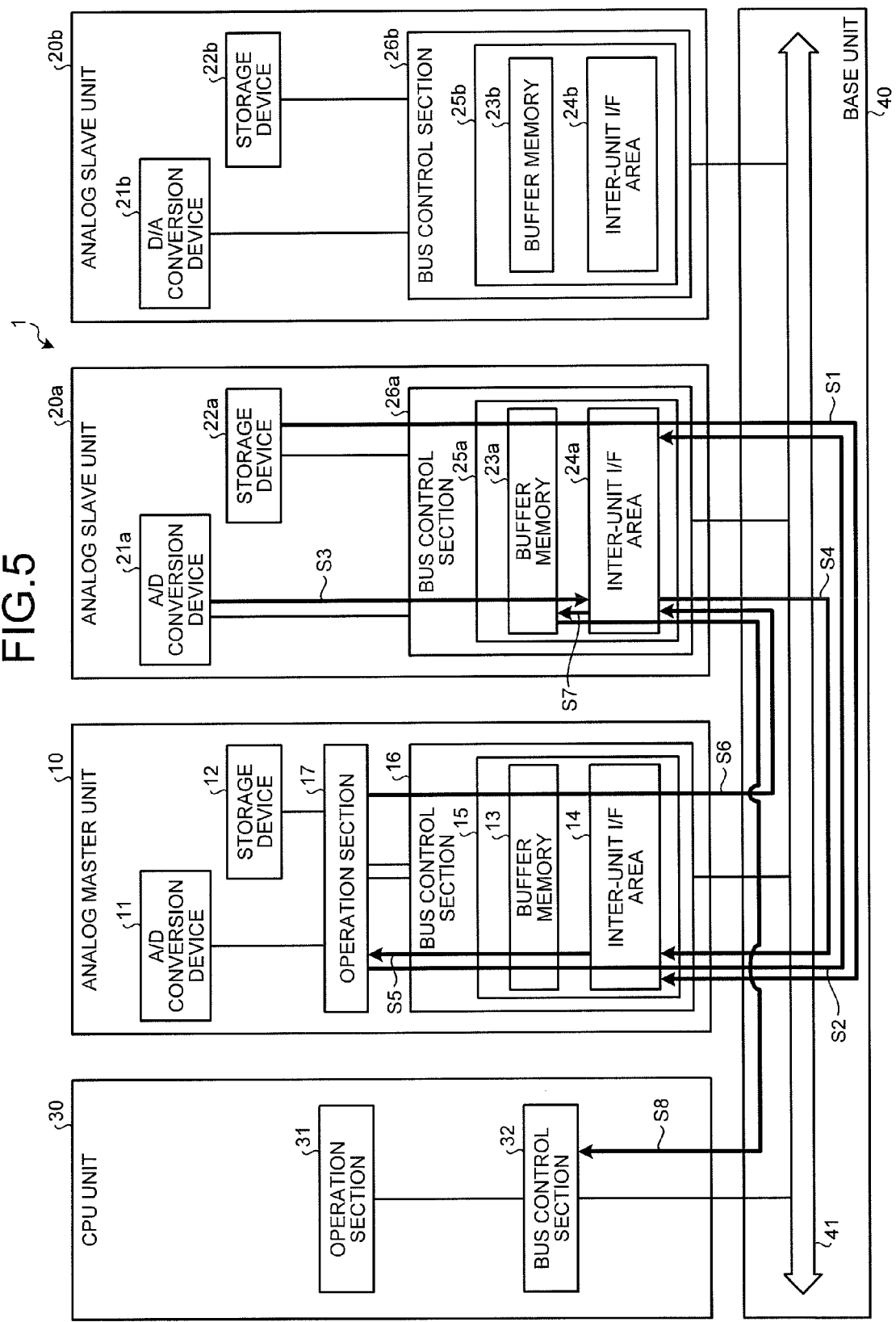
FIG. 5 is a diagram for describing an operation of the analog input/output system when handling an input signal.

Next, an operation of the analog input/output system according to the present invention will be described with reference to FIGS. 5 and 6. FIG. 5 is a diagram for describing an operation of the analog input/output system when handling an input signal. FIG. 6 is a diagram for describing an operation of the analog input/output system when handling an output signal.

As shown in the diagrams, when the PLC 1 is activated, the operation section 17 initially controls the bus control section 16 to read the specific information stored in the storage device 22a of the analog slave unit 20a and register the read specific information in the connection slave unit table 122 which is placed in the inter-unit I/F area 14 (step S1). The operation section 17 also controls the bus control section 16 to store a conversion cycle setting value in the inter-unit I/F area 24a of the analog slave unit 20a (step S2).

It should be appreciated that the operations of the steps S1 and S2 are also performed on the analog slave unit 20b.

In the analog slave unit 20a, the A/D conversion device 21a performs A/D conversion and stores after-A/D-converted data (digital value) in the inter-unit I/F area 24a (step S3). The operation of the step S3 is performed in conversion cycles described by the conversion cycle setting value that is stored in the inter-unit I/F area 24a. The after-A/D-converted data placed in the inter-unit I/F area 24a is updated each time A/D conversion is performed.

In the analog master unit 10, the operation section 17 controls the bus control section 16 to read the after-A/D-converted data stored in the inter-unit I/F area 24a of the analog slave unit 20a into the inter-unit I/F area 14 of the analog master unit 10 (step S4).

The operation section 17 then searches the numerical conversion processing table 121 stored in the storage device 12 with the unit type information 221 of the analog slave unit 20a, registered in the connection slave unit table 122 being used as a search key, and performs numerical conversion processing acquired by the search and correction processing that uses the first digital reference value 222 and the second digital reference value 223 of the analog slave unit 20a, registered in the connection slave unit table 122, on the after-A/D-converted data read into the inter-unit I/F area 14 (step S5). The operation section 17 then controls the bus control section 16 to store the data (digital value) that are (is) obtained by performing the numerical conversion processing and the correction processing in the inter-unit I/F area 24a of the analog slave unit 20a (step S6).

In the analog slave unit 20a, the bus control section 26a transfers the data that has been subjected to the numerical conversion processing and the correction processing, stored in the inter-unit I/F area 24a by the processing of the step S6, to the buffer memory 23a (step S7).

In the CPU unit 30, the bus control section 32 reads the data that has been subjected to the numerical conversion processing and the correction processing, stored in the buffer memory 23a of the analog slave unit 20a (step S8).

The data read by the bus control section 32 is transmitted to the operation section 31 and used for the operation of the user program.

Subsequently, the bus control section 32 stores data on a digital value the operation section 31 has calculated based on the operation of the user program, in the buffer memory 23b of the analog slave unit 20b (step S9).

In the analog slave unit 20b, the bus control section 26b transfers the data stored in the buffer memory 23b by the processing of the step S8 to the inter-unit I/F area 24b (step S10).

In the analog master unit 10, the operation section 17 controls the bus control section 16 to read the data stored in the inter-unit I/F area 24b by the processing of the step S9, into the inter-unit I/F area 14 of the analog master unit 10 (step S11).

The operation section 17 then takes a correction processing procedure that uses the first digital reference value 222 and the second digital reference value 223 of the analog slave unit 20b, registered in the connection slave unit table 122, and a numerical control conversion processing procedure that is acquired by searching the numerical conversion processing table 121 with the unit type information 221 on the analog slave unit 20b, registered in the connection slave unit table 122, being used as a search key, each of the procedures being performed on the data that is read into the inter-unit I/F area 14 by the processing of the step S10 (step S12). The operation section 17 then controls the bus control section 16 to store the data (digital value) obtained by performing the correction processing and the numerical conversion processing in the inter-unit I/F area 24b of the analog slave unit 20b (step S13).

In the analog slave unit 20b, the D/A conversion device 21b reads the data that is stored in the inter-unit I/F area 24b by the processing of the step S13, performs D/A conversion on the read data, and outputs the resulting analog value to an external device (step S14).

The operation of the steps S4 to S7 is repeated, for example, in the same cycle as the conversion cycle that is described by the conversion cycle setting value stored in the inter-unit I/F area 24a. The operation of the steps S8 and S9 is repeated in the scan cycle of the user program. The operation of the steps S10 to S13 is repeated, for example, in the same cycle as the conversion cycle that is described by the conversion cycle setting value stored in the inter-unit I/F area 24b. The operation of the step S14 is repeated in a conversion cycle that is described by the conversion cycle setting value stored in the inter-unit I/F area 24b.

The embodiment of the present invention has been described as the case where the analog input system includes one analog slave unit 20a that functions as an analog input unit, but it will be understood that even if the analog input system includes a plurality of analog slave units that function as analog input units, the analog master unit 10 can perform operation processing on digital values for each of the analog slave units by virtue of the configuration described above in the embodiment. Similarly, even if the analog output system includes a plurality of analog slave units that function as analog output units, the analog master unit 10 can perform operation processing on digital values for each of the analog slave units. Similarly, even if the analog input/output system includes a plurality of analog slave units that function as analog input units or a plurality of analog slave units that function as analog output units, the analog master unit 10 can perform operation processing on digital values for each of the analog slave units.

Next, a technique to be compared with the embodiment of the present invention (hereinafter, referred to as a technique according to a comparative example) will be described. FIG. 7 is a diagram for describing the technique according to the comparative example. The same components as those of the embodiment of the present invention will hereinafter be designated by the same reference symbols as them in order that redundant description is omitted.

As shown in FIG. 7, according to the technique of the comparative example, a PLC 2 includes: a CPU unit 30; a base unit 40; and an analog input/output system which includes an analog master unit 60, an analog multiplex unit 70a, and an analog multiplex unit 70b. The base unit 40 includes a bus 41. The bus 41 electrically connects the CPU unit 30 and the analog master unit 60. The CPU unit 30 includes an operation section 31 and a bus control section 32.

The analog master unit 60 includes: an A/D conversion device 61 which converts an analog value into a digital value; an operation section 63 which includes a timing generation section 62; and a bus control section 64. The analog multiplex unit 70a includes an analog multiplexer channel switch 71a and an analog signal conversion circuit 72a. Similarly, the analog multiplex unit 70b includes an analog multiplexer channel switch 71b and an analog signal conversion circuit 72b.

The analog multiplex units 70a and 70b each have a plurality of channels of input terminals. An analog value in a range defined by a specification is inputted to each input terminal. In the analog master unit 60, the timing generation section 62 generates timing for switching a select signal that selects one of all the input terminals equipped in the analog multiplex units 70a and 70b. The operation section 63 performs switching in the timing generated by the timing generation section 62 so that all the input terminals are evenly selected by the select signal. In the analog multiplex unit 70a, the analog multiplexer channel switch 71a captures an analog value from an input terminal that is specified by the select signal, and inputs the captured analog value to the analog signal conversion circuit 72a. The analog signal conversion circuit 72a converts the inputted analog value into an analog value within a range in which the analog master unit 60 can perform A/D conversion, and inputs the after-converted analog value to the A/D conversion device 61 of the analog master unit 60.

Similarly, in the analog multiplex unit 70b, the analog multiplexer channel switch 71b captures an analog value from an input terminal specified by the select signal, and inputs the captured analog value to the analog signal conversion circuit 72b. The analog signal conversion circuit 72b converts the inputted analog value into an analog value within a range in which the analog master unit 60 can perform A/D conversion, and inputs the after-converted analog value to the A/D conversion device 61 of the analog master unit 60.

The A/D conversion device 61 converts an inputted analog value into a digital value, and inputs the after-converted digital value to the operation section 63. The operation section 63 performs numerical conversion processing on the inputted digital value, and inputs the after-numerical-conversion digital value to the bus control section 64. The bus control section 32 of the CPU unit 30 reads the digital value inputted to the bus control section 64.

According to the technique of the comparative example, there is a problem that the cycle for capturing an analog value inputted from an external device increases as the number of inputs increases. Since the analog multiplex units 70a and 70b input analog values to the analog master unit 60, it takes time for the signals of the analog values to rise/fall. This increases a switching interval of the select signal, resulting in a problem that a cycle to capture an analog value is even longer. On the other hand, according to the embodiment of the present invention, data of a digital value are transferred between the units, so that it takes a shorter time for the signals to rise/fall as compared to the technique according to the comparative example. Since an analog value can be captured and outputted in a conversion cycle that is set for each analog slave unit 20, the capturing cycle of analog values and the output cycle of analog values do not depend on the number of analog inputs and outputs.

According to the technique of the comparative example, the analog multiplex units 70a and 70b are made of analog circuits, and transmit to and receive from the analog master unit 60 the analog signals. In analog circuits, A/D conversion values and D/A conversion values are typically affected by variations in parts such as resistors and operational amplifiers, and so it is necessary to correct the resulting errors. The analog multiplex units 70a and 70b therefore need to correct errors included in the analog values to be transmitted to the analog master unit 60. Consequently, according to the technique of the comparative example, the user needs to correct errors for each input terminal when constructing the PLC 2, thereby leading to a problem of a heavy burden on the user. A typical method of correcting an error in an analog value is to adjust the magnitude of the analog value to be inputted/outputted using a variable resistor. On the other hand, according to the embodiment of the present invention, a digital reference value for correction are set in each analog slave unit 20 to make correction of a digital value. The user therefore need not make adjustment for error correction.

According to the technique of the comparative example, the analog multiplex units 70a and 70b are configured to output analog values, and thereby have no means for noticing unit-specific information. Consequently, there is a problem that the user needs to prepare a corresponding analog master unit 60 for each unit type of the analog multiplex units 70a and 70b. On the other hand, according to the embodiment of the present invention, digital values are transmitted and received between the analog master unit 10 and the analog slave units 20, and the unit type information 221 can be transmitted as specific information from the analog slave units 20 to the analog master unit 10. The analog master unit 10 can select a numerical conversion processing procedure for a target unit type from among a plurality of numerical conversion processing procedures based on the received unit type information 221. Consequently, only one analog master unit 10 is required to be prepared for the analog slave units 20 of a plurality of unit types.

According to the technique of the comparative example, digital values corresponding to the respective analog values inputted to the analog multiplex units 70a and 70b are stored in addresses that are beforehand allocated for the respective input terminals in a shared memory included in the bus control section 64. Consequently, there is a problem that, when creating a user program, the user needs to examine where the multiplex units 70a and 70b are allocated to in the shared memory of the analog master unit 60. On the other hand, according to the embodiment of the present invention, the analog slave units 20 each include a buffer memory (buffer memory 23a or buffer memory 23b) that is readable and writable by the CPU unit 30, and exchange data with the CPU unit 30 using the respective buffer memory. This eliminates the need to allocate an area for each analog slave unit 20 to the buffer memory 13 included in the analog master unit 10.

As described above, according to the embodiment of the present invention, the analog slave unit 20a includes: the A/D conversion device 21a which performs A/D conversion on an analog value inputted from an external device; the nonvolatile storage device 22a which previously stores specific information (unit type information 221, a first digital reference value 222, and a second digital reference value 223) of its own unit 20a; and the buffer memory 23a for performing data transfer to/from the CPU unit 30. Additionally, the analog master unit 10 is configured to include the operation section 17 which performs operation processing (numerical conversion processing and correction processing) based on the specific information with a digital value outputted by the A/D conversion device 21a being used as an input, and to transfer the digital value obtained after the operation processing to the buffer memory 23a. With such constructions, it is possible to connect a plurality of analog slave units that function as analog input units, and the analog slave units need not include any operation section. This makes it possible to increase the number of analog inputs at low cost.

The analog slave unit 20b includes: the D/A conversion device 21b which determines an analog value to be outputted to an external device by D/A conversion; the nonvolatile storage device 22b which previously stores specific information (unit type information 221, a first digital reference value 222, and a second digital reference value 223) of its own unit 20b; and the buffer memory 23b for performing data transfer to/from the CPU unit 30. The analog master unit 10 is configured to include the operation section 17 which performs operation processing (numerical conversion processing and correction processing) based on the specific information with a digital value written from the CPU unit 30 into the buffer memory 23b being used as an input, thereby to calculate a digital value to be inputted to the D/A conversion device 21b, and to transfer the digital value obtained after the operation processing to the analog slave unit 20b. With such constructions, it is possible to connect a plurality of analog slave units that function as analog output units, and the analog slave units need not include an operation section. This makes it possible to increase the number of analog outputs at low cost.

In addition, the operation section 17 performs on the analog slave unit 20a operation processing based on the specific information of the analog slave unit 20a with a digital value outputted by the A/D conversion device 21a being used as an input, and performs on the analog slave unit 20b operation processing based on the specific information of the analog slave unit 20b with a digital value written from the CPU unit 30 into the buffer memory 23b being used as an input. By such configuration, a plurality of analog slave units that function as analog input units or a plurality of analog slave units that function as analog output units can be connected and the analog slave units need not include any operation section, so that it is possible to increase the number of analog inputs and outputs at low cost.

INDUSTRIAL APPLICABILITY

As described above, the analog input system, the analog output system, and the analog input/output system according to the present invention are suitably applied to an analog input system, an analog output system, and an analog input/output system that are mounted on a PLC.

REFERENCE SIGNS LIST 1, 2 PLC
10, 60 ANALOG MASTER UNIT
11, 21a, 61 A/D CONVERSION DEVICE
12, 22a, 22b STORAGE DEVICE
13, 23a, 23b BUFFER MEMORY
14, 24a, 24b INTER-UNIT I/F AREA
15, 25a, 25b SHARED MEMORY
16, 26a, 26b, 32, 64 BUS CONTROL SECTION
17, 31, 63 OPERATION SECTION
20a, 20b ANALOG SLAVE UNIT
21b D/A CONVERSION DEVICE
30 CPU UNIT
40 BASE UNIT
41 BUS
62 TIMING GENERATION SECTION
70a, 70b ANALOG MULTIPLEX UNIT
71a, 71b ANALOG MULTIPLEXER CHANNEL SWITCH
72a, 72b ANALOG SIGNAL CONVERSION CIRCUIT
121 NUMERICAL CONVERSION PROCESSING TABLE
122 CONNECTION SLAVE UNIT TABLE
221 UNIT TYPE INFORMATION
222 FIRST DIGITAL REFERENCE VALUE
223 SECOND DIGITAL REFERENCE VALUE

The invention claimed is:

1. An analog input system comprising:
one or more slave input units each connected to a bus to which a CPU unit is connected, and each including an A/D conversion device that is connected to an external device for outputting an analog value and converts an analog value outputted by the external device into a first digital value, a first buffer memory that buffers a second digital value to be transferred to the CPU unit, and a nonvolatile storage device that stores specific information of its own unit; and
a master unit connected to the bus and including an operation section that performs operation processing based on the specific information stored in the storage device with the first digital value outputted by the A/D conversion device being used as an input, thereby to calculate the second digital value, the master unit performing on each of the slave input units the operation processing of the operation section and processing of transferring the second digital value calculated by the operation processing to the first buffer memory.

2. The analog input system according to claim 1, wherein:
the operation processing includes numerical conversion processing that is set in advance for each slave input unit; and
the specific information is identification information for identifying numerical conversion processing that is set for its own slave input unit.

3. The analog input system according to claim 1, wherein:
the operation processing includes correction processing for each slave input unit;
the specific information is a predetermined digital reference value that is obtained by the A/D conversion device included in its own slave input unit converting an analog reference value outputted by a calibrator; and
the operation section performs the correction processing using the digital reference value.

4. The analog input system according to claim 1, wherein:
the one or more slave input units each include a second buffer memory that is readable and writable by the master unit through the bus; and
the master unit performs acquisition of the first digital value outputted by the A/D conversion device and the specific information stored in the storage device and the processing of transferring the second digital value, through the second buffer memory.

5. An analog output system comprising:
one or more slave output units each connected to a bus to which a CPU unit is connected, and each including a D/A conversion device that is connected to an external device receiving input of an analog value and converts a first digital value into an analog value to be outputted to the external device, a first buffer memory that buffers a second digital value transferred from the CPU unit, and a nonvolatile storage device that stores specific information of its own unit; and a master unit connected to the bus and including an operation section that performs operation processing based on the specific information stored in the storage device with the second digital value buffered in the first buffer memory being used as an input, thereby to calculate the first digital value, the master unit performing on each of the slave output units the operation processing of the operation section and processing of transferring the first digital value calculated by the operation processing to the slave output unit.

6. The analog output system according to claim 5, wherein:
the operation processing includes numerical conversion processing that is defined in advance for each slave output unit; and
the specific information is identification information for identifying numerical conversion processing that is defined in advance for its own slave output unit.

7. The analog output system according to claim 5, wherein:
the operation processing includes correction processing for each slave output unit;
the specific information is a predetermined digital reference value that provides a predetermined analog reference value when the digital reference value is converted by the D/A conversion device included in its own slave output unit; and
the operation section performs correction processing using the digital reference value.

8. The analog output system according to claim 5, wherein:
the one or more slave output units each include a second buffer memory that is readable and writable by the master unit through the bus; and
the master unit performs acquisition of the second digital value that is buffered by the CPU unit into the first buffer memory and the specific information stored in the storage device and the processing of transferring the first digital value, through the second buffer memory.

9. An analog input/output system comprising:
one or more slave input units each connected to a bus to which a CPU unit is connected, and each including an A/D conversion device that is connected to a first external device outputting an analog value and converts an analog value outputted by the first external device into a first digital value, a first buffer memory that buffers a second digital value to be transferred to the CPU unit, and a nonvolatile storage device that stores specific information of its own unit;

one or more slave output units each connected to the bus and each including a D/A conversion device that is connected to a second external device receiving input of an analog value and converts a third digital value into an analog value to be outputted to the second external device, a second buffer memory that buffers a fourth digital value transferred from the CPU unit, and a nonvolatile storage device that stores specific information of its own unit; and a master unit connected to the bus and including an operation section that performs on the slave input units first operation processing based on the specific information stored in the storage device with the first digital value outputted by the A/D conversion device being used as an input, thereby to calculate the second digital value, and performs on the slave output units second operation processing based on the specific information stored in the storage device with the fourth digital value buffered in the second buffer memory being used as an input, thereby to calculate the third digital value, the master unit performing on each of the slave input units the first operation processing of the operation section and processing of transferring the second digital value calculated by the first operation processing to the first buffer memory, the master unit performing on each of the slave output units the second operation processing of the operation section and processing of transferring the third digital value calculated by the second operation processing to the slave output unit.

* * * * *